Patented Aug. 28, 1951

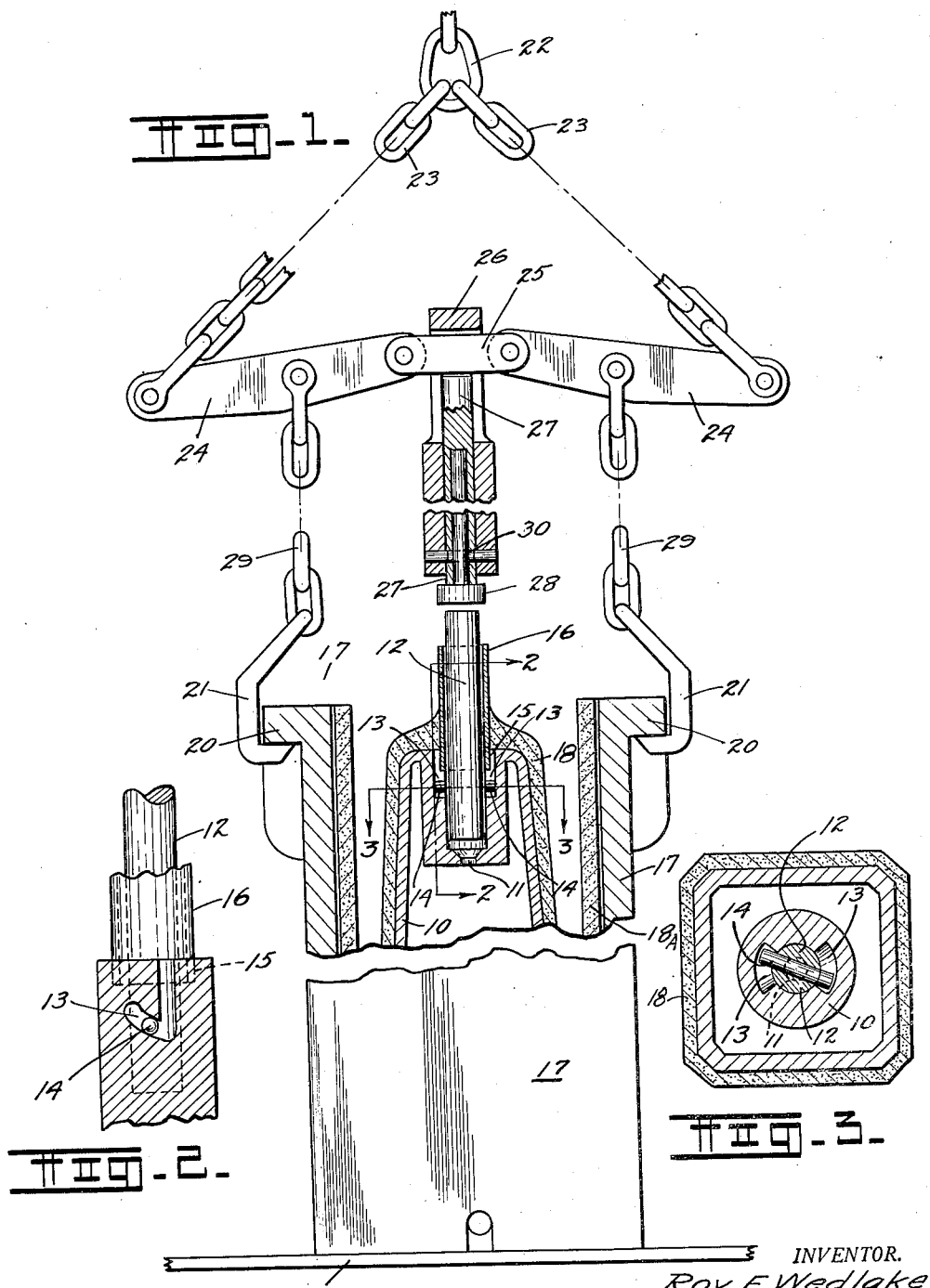

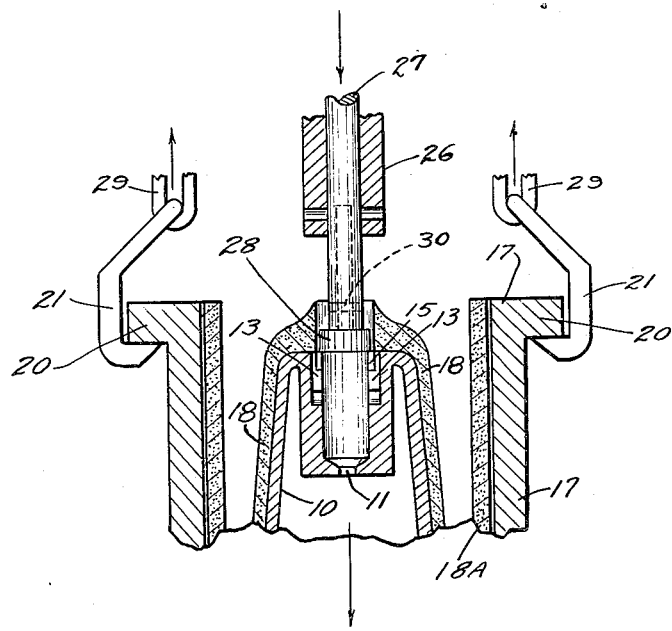

2,565,829

UNITED STATES PATENT OFFICE 2,565,829

MOLDING APPARATUS

Roy E. Wedlake, Wheatland, Pa.

Application October 13, 1949, Serial No. 121,099

4 Claims. (Cl. 22—93)

This invention relates to moulding apparatus and more particularly to an improved core and extractor construction for use with moulds for hollow castings.

The invention still more particularly relates to an improved pin and core construction particularly adapted for ingot mould casting.

The principal object of the invention is the provision of an improved pin and core construction for ingot mould casting.

A further object of the invention is the provision of a moulding apparatus incorporating a core and a removable core bar pin.

A still further object of the invention is the provision of a core for an ingot mould having a core bar socket adapted to receive and hold a core bar pin.

A still further object of the invention is the provision of a core collar for protecting the sand necks on moulds cast in moulding apparatus and permitting a core bar pin associated with said core to be loosened before a casting operation.

A still further object of the invention is the provision of a moulding apparatus including a core having a removable core bar pin which may be removed at any time after the mold is set.

A still further object of the invention is the elimination of damage to cores and core bar pins due to bending the pin when extracting the mould from the moulding apparatus.

It is known that in the casting of ingot moulds certain moulding apparatus has heretofore been used which incorporated both the means of forming the cavity in which the ingot mould was cast and means for extracting the cast ingot mould from the core and other apparatus used in defining the cavity in which the mould was cast. It is also known in the art that as generally employed in the casting of ingot moulds cores are employed with upstanding core bar pins formed integrally therewith or immovably secured thereto and which core bar pins extend upwardly through the moulding apparatus and are used in handling the core in setting up the mould and which core bar pins are engaged by an extractor to apply downward motion to the core in a cast mould to remove the same therefrom.

It is also known that prior to such core removing or extracting operation the apparatus defining the outer limiting wall or surface and generally defined as the flask is removed from the cast mould by lifting the same upwardly over the cast mould and, of course, the pin therein. Such action frequently damages the core bar pin by bending it or breaking it which renders the operation of the mechanical extractor difficult, if not impossible.

The prseent invention teaches the provision of a moulding apparatus in which the core bar pin is modified and removably mounted in the core and in which the extractor mechanism employed in removing the core is modified to act directly on the core rather than through an integrally formed pin as heretofore practiced in the art.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:

Figure 1 is a central vertical cross section through moulding apparatus incorporating a removable core bar pin.

Figure 2 is a detailed view of the removable core bar pin and its engagement in the core of the moulding apparatus shown in Figure 1.

Figure 3 is a horizontal section taken on line 3—3 of Figure 1.

Figure 4 is a detailed view of a portion of the apparatus shown in Figure 1, the core bar pin and collar not being shown in this view.

By referring to the drawings and Figure 1 in particular it will be seen that moulding apparatus is disclosed which is intended for use in the casting of ingot moulds whose walls neck-in at the top in the position the mould assumes while being cast. Such a mould is inverted when used for pouring ingots so that the neck-in portion serves as a bottom of the mould in cavity and assists in shaping the ingot and in reducing the amount of poured metal which comes in contact with the bottom of the mould.

A mould of this type cannot be cast about a straight sided collapsible core because of the fact that the size and shape of such cores precludes the formation of the necked-in top as the metal is poured. It has therefore become the common practice in casting necked-in moulds to use solid cores which do not have a large upper extremity extending above the top of the casting. The problems involved in the removal of a solid core from a cast ingot mould are known in the art and apparatus has been proposed and used for effecting the extraction of the mould core from the cast mould.

In Figure 1 of the drawings an improvement in such apparatus is disclosed and a solid core is indicated by the numeral 10 as having a vertically extending socket 11 in the upper central area thereof in which a removable core bar pin 12 is positioned. The socket 11 is provided with oppositely disposed angularly formed bayonet slots 13—13 in which oppositely disposed ends of a pin 14 positioned transversely of the bar 12 may be engaged. It will thus be seen that the core bar pin 12, when positioned in the mould core 10, stands vertically with the majority of its area extending above the top of the core 10. It will also be seen that it may be positioned in the socket 11 in the core 10 for vertical movement therefrom or that it may be rotated so that the pin 14 engages the angularly disposed bayonet slots 13—13 and thus elevates and locks the core bar pin with respect to the core 10 in such position the core bar pin 12 provides the means necessary to conveniently handle the core and mould assembly.

An annular socket 15 is formed immediately about the socket 11 as an enlargement thereof and in the upper portion of the core 10 and provides for the reception of a collar 16. The collar 16 is a tubular member removably positioned in the annular socket 15 and serves to form an element against which moulding sand 18 may be formed without engaging the removable core bar pin 12. As is customary in the art, the outer side of the mould cavity is formed by a flask 17 having an inner lining of moulding sand 18A. The ingot mould is, therefore, cast in the area or cavity defined between the sand 18 over the core 10 and the sand 18A on the inner surface of the flask 17. The flask 17 is of the conventional construction as known in the art and is adapted to rest upon a base 19 which also carries the core 10 when the mould is cast and set the core bar pin 12 is removed from the core 10. The upper edge of the flask 17 is provided with at least one pair of oppositely disposed outwardly extending flanges 20—20 so that hooks 21 of an extractor mechanism may be engaged thereinunder.

By referring now to Figure 2 of the drawings it will be seen that the bayonet slots 13—13 in the socket 11 of the core 10 are preferably formed with the offset portion of the slots at an angle from vertical and from horizontal so that the oppositely disposed end of the pin 14 in the core bar pin 12 will be caused to follow the angular slots and move upwardly into locking position when the core bar pin is rotated clockwise. By the same token counterclockwise motion imparted to the core bar pin 12 will cause it to move downwardly and release the pin 14 from the oppositely disposed bayonet slots 13—13. The horizontal cross section in Figure 3 of the drawings clearly discloses the relative positions of the bayonet slots 13—13 and the pin 14 in the core 10 and forming recesses in the core 10 with respect to the socket 11.

By referring again to Figure 1 of the drawings it will be seen that the extracting means includes a ring 22 adapted to be connected to a crane hook. The ring 22 is connected to a pair of oppositely disposed chains 23—23. Pivoted to the extremity of each chain 23 is a lever 24, the inner adjacent ends of the levers 24—24 being pivoted to a cross piece 25 located for vertical movement in an extractor housing 26. The cross piece 25 is connected with an extractor pin 27 which is arranged for vertical movement in the extractor housing 26 and the lowermost portion of the extractor pin 27 is detachably secured to an extractor pin extension which is indicated by the numeral 28. The extension 28 may be removed and replaced with a similar extension of greater or lesser length to bridge the distance between the extractor pin 27 and the core 10. Pivoted intermediate the ends of the levers 24—24 are chains 29, the lower ends of which are connected to the hooks 21 heretofore disclosed.

In operating the device, as shown in Figures 1 and 4 of the drawings, the collar and core pin having first been removed, the flask 17 is picked up through the agency of the extractor as the hooks 21 are engaged therewith, as heretofore described. The upward movement of the crane connected with the ring 22 will move the outer ends of the levers 24—24 upwardly and they will, in effect, pivot on the upper ends of the chains 29—29 while their innermost adjacent ends will move the cross piece 25 downwardly with the extractor pin 27 and through its extension 28 engage and forcibly move the core 10 as best illustrated in Figure 4 of the drawings.

It will be apparent to those skilled in the art that the length of the extension 28 on the extractor pin 27 is such that the maximum leverage resulting from the pivotal mounting of the levers 24—24 may be utilized in supplying the maximum downward motion of the extractor pin 27 and the extension 28 with respect to the core 10. The extension 28 of the extractor pin 27 is of a diameter capable of passing through the opening in the cast ingot mould and as originally defined by the collar 16 heretofore referred to. It will thus be seen that there is no possibility of damaging the core pin 12 as the same is removed prior to the actual extracting operation and the extractor pin 27 and its extension 28 serve to replace the same in the leverage of the core 10 in the ingot mould. The ingot mould may be stripped of both the flask 17 and the core 10 by this operation.

Still referring to Figure 4 of the drawings it will be seen that the extension 28 is secured to the extractor pin 27 by its normal engagement in the tubular end of the pin 27 by the provision of a transversely positioned locking pin 30. It will thus be seen that when the core position varies with respect to the flask 17 and/or the ingot mould cast therein, a substitute extension piece 28 can be readily affixed to the pin 27 so that the device is usable in the manner hereinbefore described.

Modifications of the construction herein disclosed will occur to those skilled in the art and one such modification will reside in the formation of the bayonet slot 13, as shown in Figure 2 of the drawings, and which serves to lock the core pin 12 in position.

It will be obvious to those skilled in the art that rather than form the slot 13 in an angular pattern so that the pin 12 is elevated as it is locked in position therein, the same may be formed on a horizontal plane so that a simple rotating motion of the pin 12 will lock it in place. In this connection attention is invited to the formation of the socket 11 in the core 10 and the provision in the bottom thereof of an opening so that any sand or other material falling into the socket 11 will automatically be removed therefrom through the opening in the bottom of the socket 11.

It will thus be seen that the several objects of the invention are met by the moulding apparatus disclosed herein and that the several advantages set forth in the objects are achieved by the use thereof. In addition it will be observed that the collar 16 protects the sand necks on the moulds and permits the core pin 12 to be loosened before the mould is cast, thus providing means for offset expansion of these parts due to the heat of the mould when cast. Damage otherwise resulting to the mould and/or the sand neck and flask and/or core bar pin is thus completely eliminated.

Having thus described my invention, what I claim is:

1. Apparatus for forming sand moulds including a core member having a removable upstanding annular collar mounted in a socket on the uppermost end of the core when in casting position and a vertical socket in the uppermost end portion of the core within the said collar, the second socket being of a diameter substantially less than the diameter of the first mentioned socket, a pin positioned in the second socket and extending vertically therefrom beyond the upper end of said collar, and means removably securing the pin in the second socket, said collar constituting means against which sand may be moulded to form an annular wall of sand thereabout spaced with respect to said pin.

2. Apparatus for forming sand moulds including a core member having a removable upstanding annular collar mounted in a socket on the uppermost end of the core when in casting position and a vertical socket in the uppermost end portion of the core within the said collar, the second socket being of a diameter substantially less than the diameter of the first mentioned socket, a pin positioned in the second socket and extending vertically therefrom beyond the upper end of said collar, said second socket having offset slots in the side wall thereof, and laterally projecting portions on the lower part of said core pin cooperating with said offset slots in the side wall of the second socket removably securing the pin in the second socket, said collar constituting means against which sand may be moulded to form an annular wall of sand thereabout spaced with respect to said pin.

3. Moulding apparatus including a core member and a flask, the core member having a socket extending longitudinally inwardly from its uppermost end when in casting position within the flask, said socket being enlarged at its upper end forming an annular seat concentric with the socket, the socket being of a diameter substantially less than the diameter of said end of the core, a pin removably interlocked with the socket and extending longitudinally beyond said end of the core, a collar having its lower end removably seated in said annular seat of the core member and against which collar sand may be moulded so as to form an annular wall of sand thereabout spaced with respect to said pin, the collar encircling the pin in spaced relation therewith and extending beyond said end of the core, and core extracting means including a second pin vertically disposed and vertically movable for exerting downward pressure on the core, said second pin being of a size to enter said annular seat on the core member and engage the bottom wall thereof after said collar and core pin have been removed.

4. Moulding apparatus including a core member and a flask, the core member having a socket extending longitudinally inwardly from its uppermost end when in casting position within the flask, said socket being enlarged at its upper end forming an annular seat concentric with the socket, the socket being of a diameter substantially less than the diameter of said end of the core, a pin removably interlocked with the socket and extending longitudinally beyond said end of the core, a collar having its lower end removably seated in said annular seat of the core member and against which collar sand may be moulded so as to form an annular wall of sand thereabout spaced with respect to said pin, the collar encircling the pin in spaced relation therewith and extending beyond said end of the core, and core extracting means including a second pin vertically disposed and vertically movable for exerting downward pressure on the core, hooks connected with said pin for engaging a lateral flange on the end of the flask and exerting upward pressure on the flask, and operating mechanism connected with said hooks for simultaneously moving the vertically disposed pin downwardly to exert downward pressure on the core, and moving the hooks upwardly to exert upward pressure upon the flask, said second pin being of a size to enter the annular seat on the core member and engage the bottom wall thereof after said collar and core pin have been removed.

ROY E. WEDLAKE.

REFERENCES CITED

The following references are of record in the file of this patent:

UNITED STATES PATENTS

| Number | Name | Date |
| --- | --- | --- |
| 211,951 | Adams | Feb. 4, 1879 |
| 868,607 | Leuthner | Oct. 15, 1907 |
| 1,122,046 | Tickner | Dec. 22, 1914 |
| 1,792,801 | Blackwell | Feb. 17, 1931 |
| 1,881,055 | Leuthner | Oct. 4, 1932 |